US010394369B2

(12) United States Patent
Tsuruma et al.

(10) Patent No.: US 10,394,369 B2
(45) Date of Patent: Aug. 27, 2019

(54) DISPLAY DEVICE

(71) Applicant: Japan Display Inc., Minato-ku (JP)

(72) Inventors: Takeyuki Tsuruma, Tokyo (JP); Masaru Uchiyama, Tokyo (JP); Michiaki Sakamoto, Tokyo (JP); Koji Ishizaki, Tokyo (JP)

(73) Assignee: Japan Display Inc., Minato-ku (JP)

( * ) Notice: Subject to any disclaimer, the term of this patent is extended or adjusted under 35 U.S.C. 154(b) by 394 days.

(21) Appl. No.: 15/292,769

(22) Filed: Oct. 13, 2016

(65) Prior Publication Data

US 2017/0102817 A1 Apr. 13, 2017

(30) Foreign Application Priority Data

Oct. 13, 2015 (JP) ................................ 2015-201915

(51) Int. Cl.
*G06F 3/045* (2006.01)
*G06F 3/041* (2006.01)
(Continued)

(52) U.S. Cl.
CPC ........ *G06F 3/0416* (2013.01); *G02F 1/13338* (2013.01); *G02F 1/134309* (2013.01); *G02F 1/136286* (2013.01); *G06F 3/044* (2013.01); *G06F 3/0412* (2013.01); *G09G 3/3648* (2013.01); *G02F 1/1368* (2013.01); *G02F 1/13624* (2013.01); *G02F 1/133345* (2013.01); *G02F 2001/134345* (2013.01); *G02F 2001/136295* (2013.01); *G02F 2201/121* (2013.01); *G02F 2201/123* (2013.01); *G02F 2201/52* (2013.01);
(Continued)

(58) Field of Classification Search
CPC .......... G06F 3/044; G06F 3/0412; G06F 1/16; G06F 2203/04111; G06F 2203/04112
See application file for complete search history.

(56) References Cited

U.S. PATENT DOCUMENTS

2008/0117231 A1* 5/2008 Kimpe .................... G09G 3/20 345/629
2013/0093706 A1* 4/2013 Kurasawa ............ G06F 3/0412 345/173
(Continued)

FOREIGN PATENT DOCUMENTS

CN 104966728 A * 10/2015 ............ H01L 51/56
JP 2014-191660 10/2014

*Primary Examiner* — Nelson M Rosario
*Assistant Examiner* — Andrew Lee
(74) *Attorney, Agent, or Firm* — Oblon, McClelland, Maier & Neustadt, L.L.P.

(57) ABSTRACT

According to one embodiment, a display device includes a display area with pixels, and a detection electrode which includes first conductive lines overlapping the display area. Each of the pixels includes a first subpixel, a second subpixel adjacent to the first subpixel in a first direction, a third subpixel adjacent to the first subpixel in a second direction, and a fourth subpixel adjacent to the third subpixel in the first direction and to the second subpixel in the second direction. The pixels are arranged in the first direction with a first pitch, and the first conductive lines are arranged in the first direction with a second pitch which falls within a range of 2.2 times the first pitch or more and 3.2 times the first pitch or less.

17 Claims, 9 Drawing Sheets

(51) Int. Cl.

| | |
|---|---|
| ***G02F 1/1333*** | (2006.01) |
| ***G02F 1/1343*** | (2006.01) |
| ***G02F 1/1362*** | (2006.01) |
| ***G06F 3/044*** | (2006.01) |
| ***G09G 3/36*** | (2006.01) |
| *G02F 1/1368* | (2006.01) |

(52) U.S. Cl.
CPC .............. *G06F 2203/04103* (2013.01); *G06F 2203/04108* (2013.01); *G06F 2203/04112* (2013.01); *G09G 2300/0426* (2013.01); *G09G 2300/0452* (2013.01)

(56) References Cited

U.S. PATENT DOCUMENTS

2014/0293158 A1 10/2014 Kurasawa et al.
2016/0018928 A1 1/2016 Kurasawa et al.
2016/0062409 A1* 3/2016 Guard ..................... G06F 3/044 349/12
2016/0179270 A1* 6/2016 Li ......................... G06F 3/0416 345/173
2016/0202814 A1* 7/2016 Lee ......................... G06F 3/044 345/173
2017/0148366 A1* 5/2017 Hsin ....................... H01L 51/56

* cited by examiner

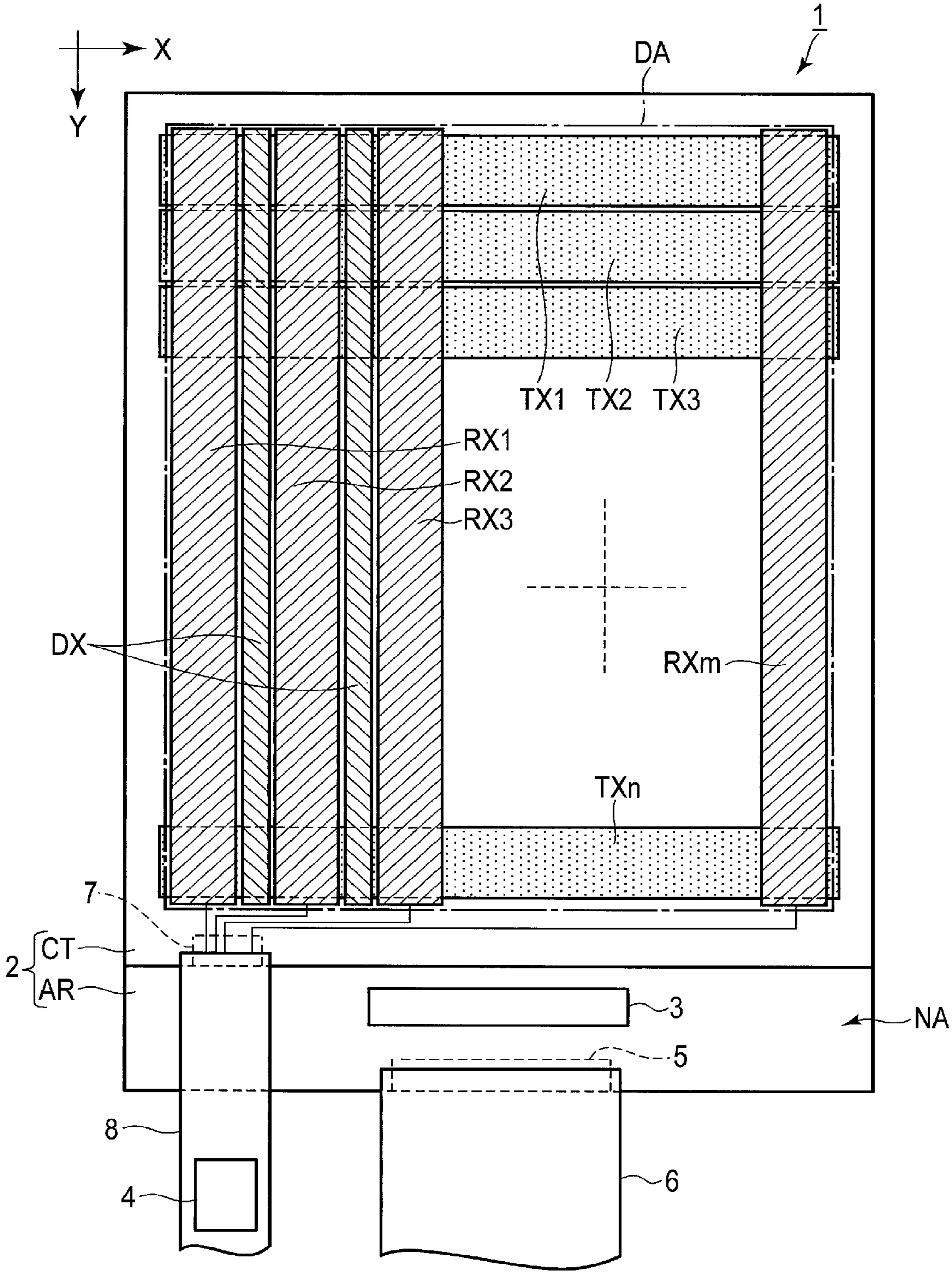
F I G. 1

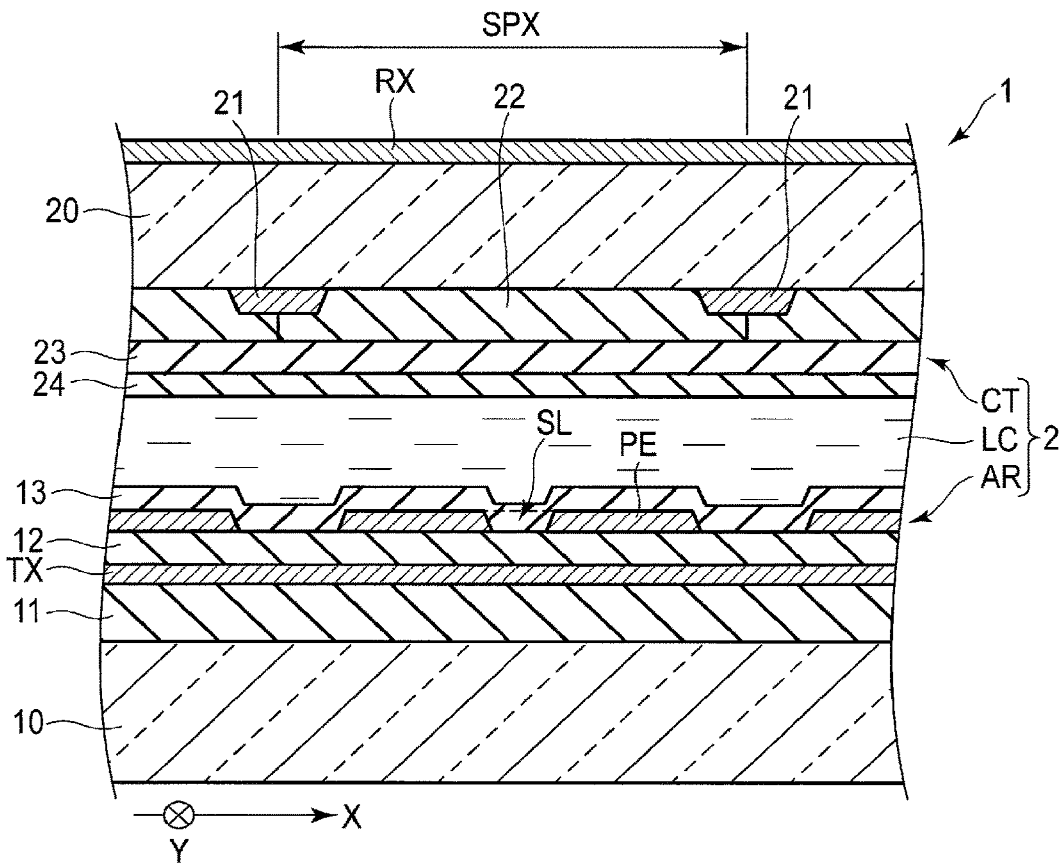
F I G. 2

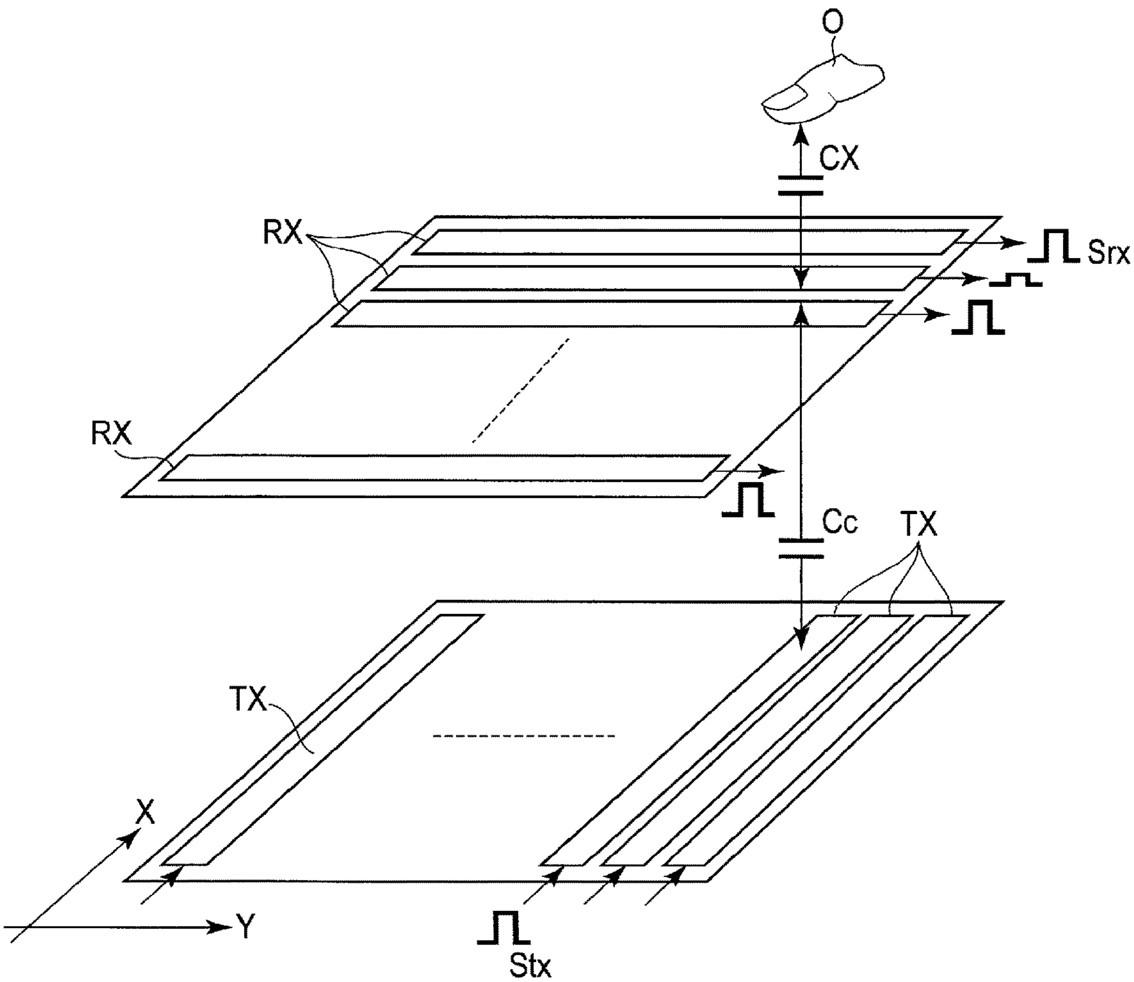
F I G. 3

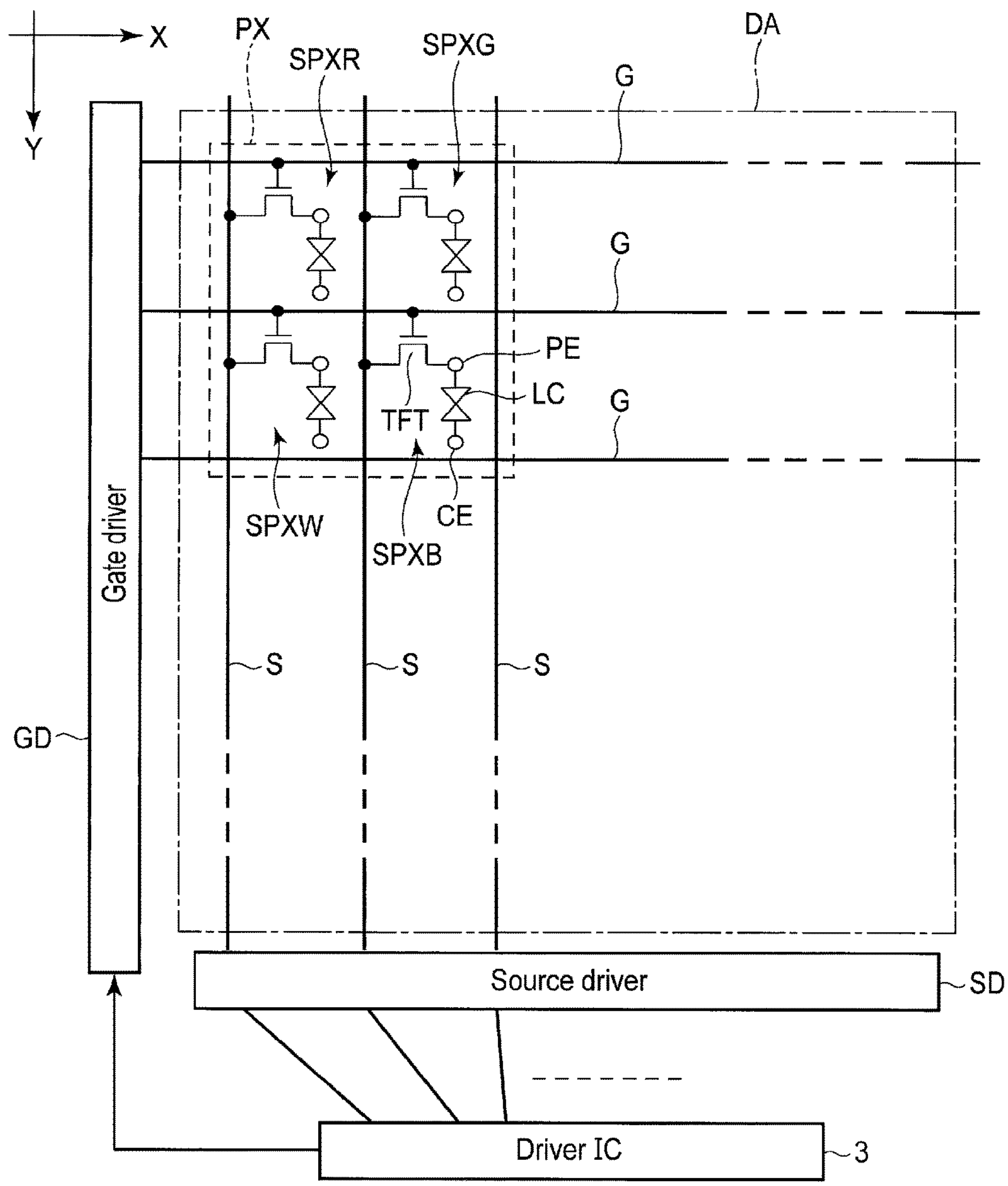
F I G. 4

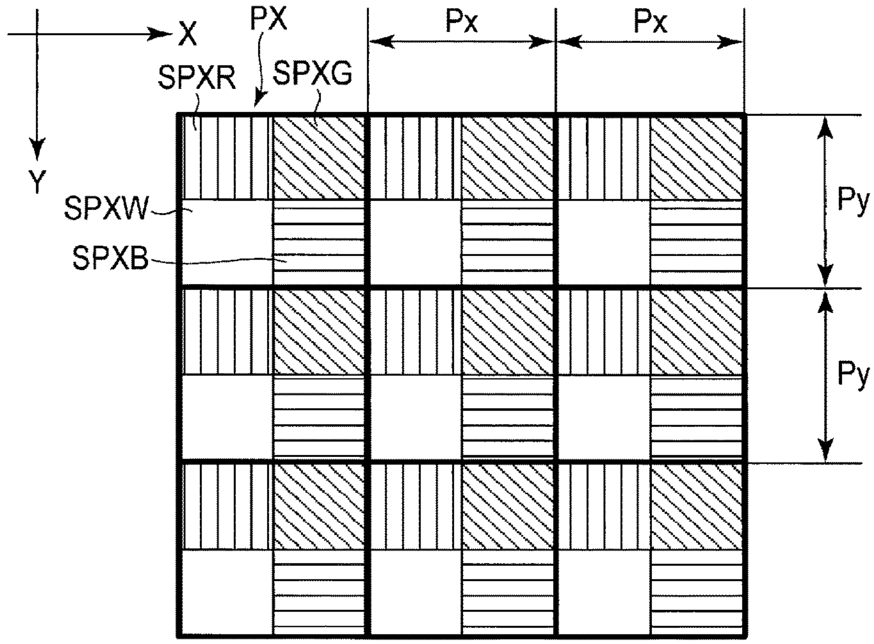
F I G. 5
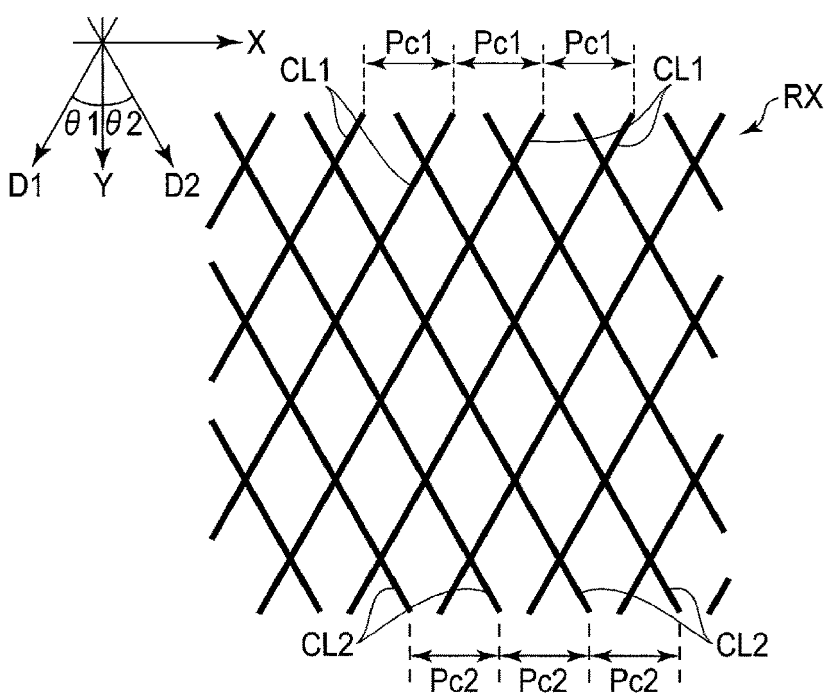
F I G. 6

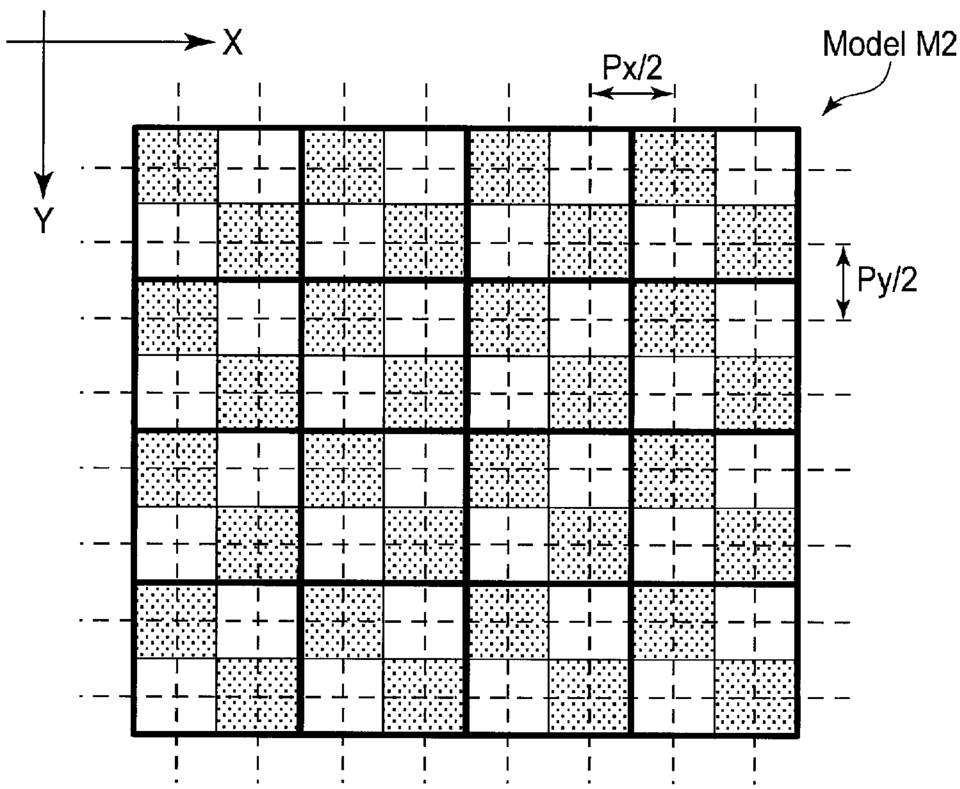
F I G. 9

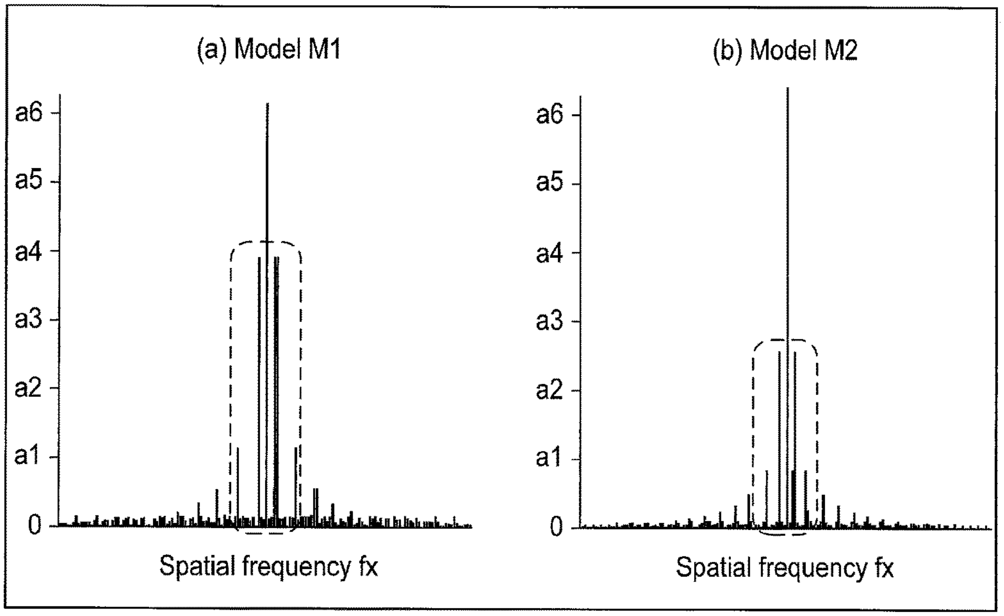
F I G. 10
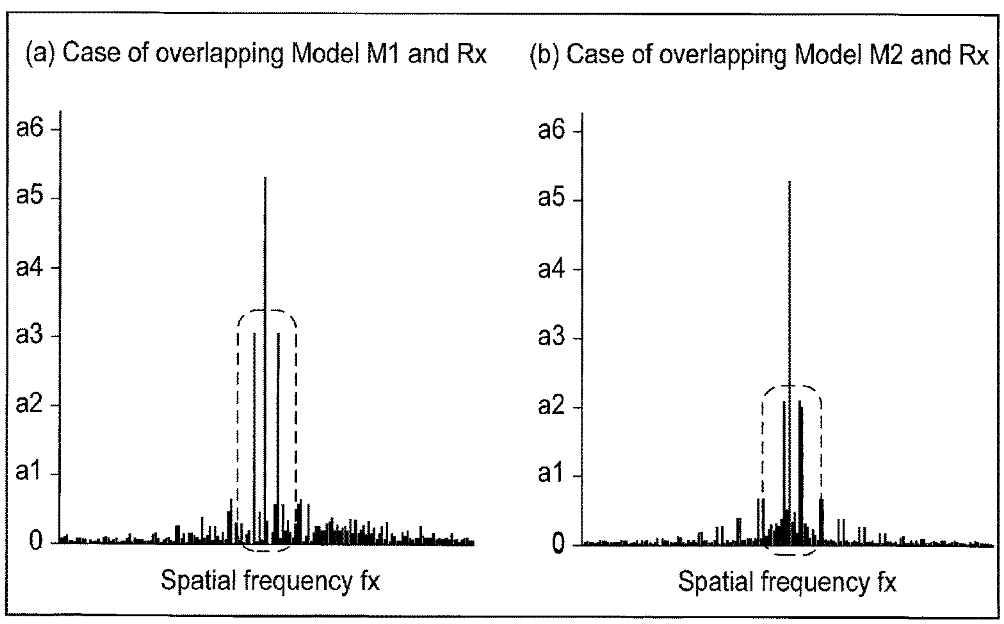
F I G. 11

θ 1[deg]

| Pc1/Px | 5 | 7.5 | 10 | 13 | 16 | 19 | 23 | 27 | 31 | 36 |
|---|---|---|---|---|---|---|---|---|---|---|
| 1.8 | × | × | × | × | × | × | × | ○ | × | × |
| 2.0 | × | × | × | × | × | × | × | △ | × | × |
| 2.2 | × | × | × | △ | × | × | × | △ | × | ○ |
| 2.4 | × | ○ | × | △ | △ | △ | × | ○ | × | × |
| 2.6 | × | × | × | ○ | ○ | ○ | ○ | ○ | × | × |
| 2.8 | × | × | × | ○ | ○ | ○ | ○ | ○ | ○ | × |
| 3.0 | × | × | △ | △ | ○ | △ | △ | × | ○ | × |
| 3.2 | × | × | △ | × | × | △ | △ | × | △ | × |
| 3.4 | × | × | × | × | × | × | × | × | × | × |
| 3.6 | × | × | × | × | × | × | × | × | × | × |
| 3.8 | × | × | × | × | × | × | × | × | × | × |
| 4.0 | × | × | × | × | × | × | × | × | × | × |
| 4.2 | × | × | × | × | × | × | × | × | × | × |
| 4.4 | × | × | × | × | × | × | × | × | × | × |
| 4.6 | × | × | × | × | × | × | × | × | × | × |
| 4.8 | × | × | × | × | × | × | × | × | × | × |
| 5.0 | × | × | × | × | × | × | × | × | × | × |
| 5.2 | × | × | × | × | × | × | × | × | × | × |
| 5.4 | × | × | × | × | × | × | × | × | × | × |
| 5.6 | × | × | × | × | × | × | × | × | × | × |
| 5.8 | × | × | × | × | × | × | × | × | × | × |
| 6.0 | × | × | × | × | × | × | × | × | × | × |

Level 1: ○ Level 2: △ Level 3: ×

F I G. 12

DISPLAY DEVICE

CROSS-REFERENCE TO RELATED APPLICATIONS

This application is based upon and claims the benefit of priority from Japanese Patent Application No. 2015-201915, filed Oct. 13, 2015, the entire contents of which are incorporated herein by reference.

FIELD

Embodiments described herein relate generally to a display device.

BACKGROUND

A display device which has the function of detecting an object in proximity to a display area has been in practical use. As the detection method, there is a method of detecting an object being in proximity based on a change in capacitance between a detection electrode and a driving electrode which are opposed to each other via a dielectric or based on a change in capacitance of a detection electrode itself.

A detection electrode is formed of, for example, conductive lines such as metal lines. However, if such detection electrodes are arranged in such a manner as to overlap a display area, conductive lines interfere with pixels included in the display area, and fringes (so-called moiré) may occur.

BRIEF DESCRIPTION OF THE DRAWINGS

FIG. 1 is a schematic plan view of the structure of a display device of an embodiment.

FIG. 2 is a schematic sectional view of the display device.

FIG. 3 is a diagram showing an object detection principle of the display device.

FIG. 4 is a diagram showing an equivalent circuit for image display of the display device.

FIG. 5 is a schematic diagram showing some pixels provided in the display device.

FIG. 6 is a schematic diagram showing a part of a detection electrode provided in the display device.

FIG. 9 is a diagram showing a model in which each subpixel is replaced with a white area or a black area in the pixel layout of FIG. 5.

FIG. 10 includes graphs, each showing a result of analysis of spatial frequencies of each model.

FIG. 11 includes graphs, each showing a result of analysis of spatial frequencies of an image displayed when each model overlaps the detection electrodes.

FIG. 12 is a table showing results of evaluation of moiré created when the pixel pattern of FIG. 5 overlaps the electrode pattern of FIG. 6.

DETAILED DESCRIPTION

Figure 7:
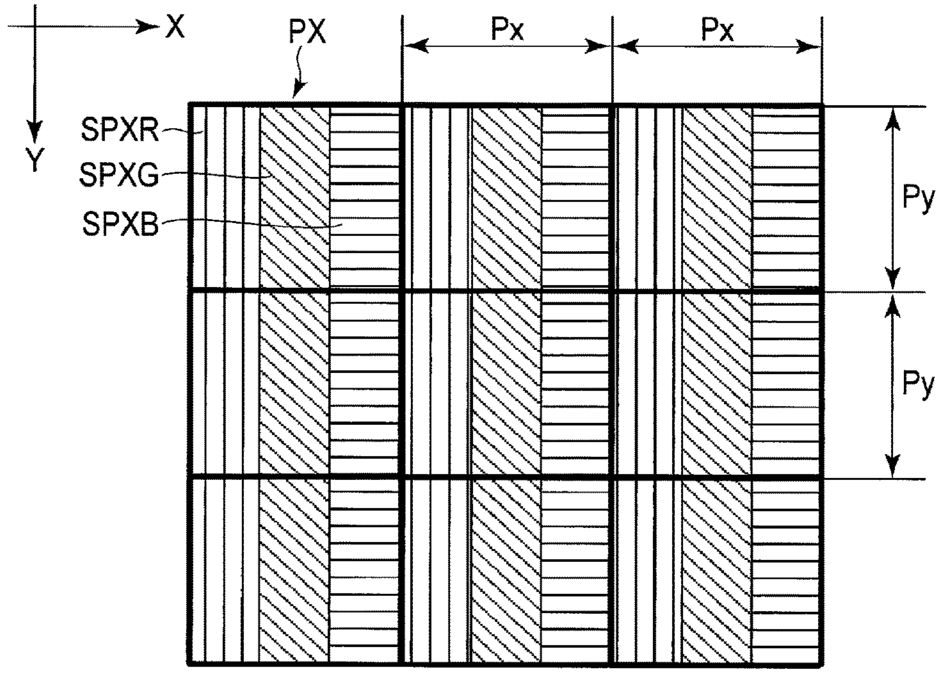
FIG. 7 is a diagram showing a pixel layout of a comparative example of the embodiment.

An embodiment will be described hereinafter with reference to the accompanying drawings.

In general, according to one embodiment, a display device comprises: a display area which includes a plurality of pixels; and a detection electrode which includes a plurality of first conductive lines overlapping the display area. Each of the pixels includes a first subpixel, a second subpixel adjacent to the first subpixel in a first direction, a third subpixel adjacent to the first subpixel in a second direction crossing the first direction, and a fourth subpixel adjacent to the third subpixel in the first direction and adjacent to the second subpixel in the second direction. The pixels are arranged in the first direction with a first pitch, and the first conductive lines are arranged in the first direction with a second pitch which falls within a range of 2.2 times the first pitch or more and 3.2 times the first pitch or less.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the respective parts are illustrated in the drawings schematically, rather than as an accurate representation of what is implemented. However, such schematic illustration is merely exemplary and in no way restricts the interpretation of the invention. In the drawings, reference numbers of continuously arranged elements equivalent or similar to each other are omitted in some cases. In addition, in the specification and drawings, structural elements equivalent or similar to those described in connection with preceding drawings are denoted by the same reference numbers, and detailed description thereof is omitted unless necessary.

In the following embodiment, as an example of a display device, a display device having the function of displaying an image using a liquid crystal display element and the function of detecting an object such as a user's finger will be described. However, the embodiment does not preclude the application of individual technical ideas disclosed in the embodiment to display devices comprising display elements other than the liquid crystal display element. As these display device, for example, a self-luminous display device comprising an organic electroluminescent display element, or an electronic-paper type display device comprising a cataphoretic element may be considered. Further, to realize the object detection function and the image display function, a device having the object detection function and a device having the image display function may be separately provided.

FIG. 1 is a schematic plan view of the structure of a display device 1 of the present embodiment. The display device 1 can be used for various devices such as smartphones, tablet computers, featurephones, personal computers, television receivers, vehicle-mounted devices, and game consoles.

The display device 1 comprises a display panel 2, and the display panel 2 comprises driving electrodes TX (TX1 to TXn), detection electrodes RX (RX1 to RXm) which are respectively opposed to the driving electrodes TX, a driver IC 3 which functions as a driver module, and a touch detection IC 4 which functions as a detection module. Here, n and m are, for example, integers greater than or equal to two. The driving electrodes may also be referred to as common electrodes. The touch detection IC 4 may be provided outside the display panel 2. Further, the driving electrodes TX (TX1 to TXn), the detection electrodes RX (RX1 to RXm) which are respectively opposed to the driving electrodes TX, and the touch detection IC 4 which functions as a detection module may constitute a touch detection panel and may be separately provided from the display panel.

The display panel 2 comprises a rectangular array substrate AR (first substrate) and a rectangular countersubstrate CT (second substrate) which is smaller in outer shape than the array substrate AR. In the example shown in FIG. 1, the array substrate AR and the countersubstrate CT are attached to each other such that three sides of one substrate are laid on three sides of the other substrate. The array substrate AR comprises a terminal area NA (unopposed area) which is not opposed to the countersubstrate CT.

In an area where the array substrate AR and the countersubstrate CT are opposed to each other, the display panel 2 comprises a display area (active area) DA which displays an image. In the example shown in FIG. 1, the display area DA is a rectangle whose short sides extend in the first direction X and whose long sides extend in the second direction Y. Note that the shape of the display area DA is not necessarily a rectangle but may be another shape such as a square, a circle, or an oval. Further, the first direction X and the second direction Y are orthogonal to each other in the present embodiment, but the first direction X and the second direction Y may cross each other at another angle.

In the display area DA, the driving electrodes TX1 to TXn extend in the first direction X and are arranged in the second direction Y. The driving electrodes TX1 to TXn can be formed of a transparent conductive material such as indium tin oxide (ITO). In the display area DA, the detection electrodes RX1 to RXm extend in the second direction Y and are arranged in the first direction X. Note that the driving electrodes TX1 to TXn may extend in the second direction Y and be arranged in the first direction X and the detection electrodes RX1 to RXm may extend in the first direction X and be arranged in the second direction Y.

The driver IC 3 executes image display control and is mounted in the terminal area NA. A mounting terminal 5 is formed in the terminal area NA. To the mounting terminal 5, a first flat flexible cable 6 which supplies image data to the display panel 2 is connected.

A mounting terminal 7 is formed at one end of the countersubstrate CT located along the terminal area NA. The mounting terminal 7 is electrically connected to the detection electrodes RX1 to RXm. To the mounting terminal 7, a second flat flexible cable 8 which outputs detection signals from the detection electrodes RX1 to RXm is connected. The touch detection IC 4 is mounted, for example, on the second flat flexible cable 8.

In the example shown in FIG. 1, a dummy electrode DX is disposed between two adjacent detection electrodes RX. A clearance is provided between each of the adjacent detection electrodes RX and the dummy electrode DX. The dummy electrodes DX are not connected to the mounting terminal 7 but are electrically floating. A dummy electrode DX of this type can prevent optical unevenness of display between a portion of the display area DA which is provided with the detection electrode RX and a portion of the display area DA which is not provided with the detection electrode RX. Note that the detection electrodes RX1 to RXm and the dummy electrodes DX are simply illustrated as strap-like elements in FIG. 1 for the same of convenience, but as will be described later with reference to FIG. 6, the detection electrodes RX1 to RXm and the dummy electrodes XD are formed of conductive lines, more specifically, metal lines.

FIG. 2 is a schematic sectional view of the display device 1 in the display area DA. This sectional view focuses on one subpixel SPX. A plurality of subpixels SPX corresponding to different colors constitutes one pixel for color image display.

In the example shown in FIG. 2, the array substrate AR comprises a first insulating substrate 10, a first insulating layer 11, a second insulating layer 12, a first alignment film 13, the pixel electrode PE, and the driving electrode TX. The first insulating layer 11 is formed on a surface of the first insulating substrate 10 on the countersubstrate CT side. The driving electrode TX is formed on the first insulating layer 11. The second insulating layer 12 covers the driving electrode TX. The pixel electrode PE is provided in each subpixel SPX and is formed on the second insulating layer 12. For example, the pixel electrode PE comprises one or more slits SL. Note that the pixel electrode PE may extend in the second direction Y in the drawing or the pixel electrode PE may be a single linear electrode comprising no slit. The first alignment film 13 covers the pixel electrode PE.

The countersubstrate CT comprises a second insulating substrate 20, a light-blocking layer 21, a color filter 22, an overcoat layer 23, and a second alignment film 24. The light-blocking layer 21 is formed on a surface of the second insulating substrate 20 on the array substrate AR side and defines the subpixel SPX. The color filter 22 is formed on a surface of the second insulating substrate 20 on the array substrate AR side, and is colored according to the color of the subpixel SPX. Note that the color filter 22 may not be provided for the subpixel SPX configured to perform white display (subpixel SPXW which will be described later). The overcoat layer 23 covers the color filter 22. The second alignment film 24 covers the overcoat layer 23. A liquid crystal layer LC including liquid crystal molecules is formed between the first alignment film 13 and the second alignment film 24.

The detection electrode RX is formed on a surface of the second insulating substrate 20 which is not opposed to the array substrate AR. The dummy electrode DX is also formed on the surface of the second insulating substrate 20 which is not opposed to the array substrate AR. Note that, although the driving electrode TX is formed in the array substrate AR in the example shown in FIG. 2, the driving electrode TX may be formed in the countersubstrate CT. Further, as the internal structure of the display panel 2, not only the above-described structure but also various other structures can be adopted.

Next, an example of the principle of the detection of an object in proximity to the display area DA by the driving electrode TX and the detection electrode RX will be described with reference to FIG. 3. There is capacitance Cc between the driving electrode TX and the detection electrode RX which are opposed to each other. When a driving signal Stx is supplied to the driving electrode TX, electric current flows to the detection electrode RX via the capacitance Cc, and a detection signal Srx is obtained from the detection electrode RX.

When an object O, which is a conductor such as a user's finger, approaches the display device 1, capacitance Cx is produced between the detection electrode RX in proximity to the object O and the object O. When the driving signal Stx is supplied to the driving electrode TX, the waveform of the detection signal Srx obtained from the detection electrode RX in proximity to the object O changes under the influence of the capacitance Cx. That is, the touch detection IC 4 can detect the object O in proximity to the display device 1 based on the detection signal Srx obtained from each detection electrode RX. Further, the touch detection IC 4 can detect the two-dimensional position of the object O in the first direction X and in the second direction Y based on the detection signal Srx obtained from each detection electrode RX in each time phase where the driving signal Stx is sequentially supplied to each driving electrode TX in a time-division manner. The above-described method is referred to as a mutual-capacitive method, a mutual-detection method, or the like.

Next, the image display by the display device 1 will be described. FIG. 4 is a schematic diagram showing the equivalent circuit for the image display. The display device 1 comprises a gate driver GD, a source driver SD, scanning lines G which are connected to the gate driver GD, and signal lines S which are connected to the source driver SD and cross the scanning lines G, respectively.

In the display area DA, the scanning lines G extend in the first direction X and are arranged in the second direction Y. In the display area DA, the signal lines S extend in the second direction Y and are arranged in the first direction X. The scanning lines G and the signal lines S are formed in the array substrate AR.

In the example shown in FIG. 4, each area defined by the scanning lines G and the signal lines S corresponds to one subpixel SPX. In the present embodiment, a subpixel SPXR configured to perform red display, a subpixel SPXG configured to perform green display, a subpixel SPXB configured to perform blue display, and a subpixel SPXW configured to perform white display constitutes one pixel PX.

Each subpixel SPX comprises a thin-film transistor TFT (switching element) formed in the array substrate AR. The thin-film transistor TFT is electrically connected to the scanning line G, the signal line S, and the pixel electrode PE. In the display operation, the driving electrode TX is set at a common potential and functions as the so-called common electrode.

The gate driver GD sequentially supplies a scanning signal to each scanning line G. The source driver SD selectively supplies an image signal to each signal line S. When a scanning signal is supplied to the scanning line G connected to a certain thin-film transistor TFT and if an image signal is supplied to the signal line S connected to this thin-film transistor TFT, the voltage corresponding to this image signal is applied to the pixel electrode PE. At this time, an electrical field is produced between the pixel electrode PE and the driving electrode TX, and this electrical field changes the alignment of the liquid crystal molecules of the liquid crystal layer LC from an initial alignment state where the voltage is not applied to the pixel electrode PE. In this way, an image is displayed in the display area DA.

The display device 1 having the above-described structure may be a transmissive display device which displays an image using light from a backlight provided on the back surface (surface which is not opposed to the countersubstrate CT) of the array substrate AR, a reflective display device which displays an image using reflected light of external light which enters from the outer surface (surface which is not opposed to the array substrate AR) of the countersubstrate CT, or a transreflective display device which has the function of a transmissive display device as well as the function of a reflective display device.

Next, the planar layout of the subpixels SPX will be described. FIG. 5 is a schematic diagram showing some of the pixels PX included in the display area DA. The pixels PX are arranged in the first direction X with a pitch Px. Further, the pixels PX are arranged in the second direction Y with a pitch Py. Here, the pitch Px and the pitch Py are, for example, the same as each other. Note that the pitch Px and the pitch Py may be different from each other.

In each pixel PX, the subpixel SPXR and the subpixel SPXG are adjacent to each other in the first direction X, and the subpixel SPXW and the subpixel SPXB are adjacent to each other in the first direction X. Further, the subpixel SPXR and the subpixel SPXW are adjacent to each other in the second direction Y, and the subpixel SPXG and the subpixel SPXB are adjacent to each other in the second direction Y. In the subpixels SPXR, SPXG, SPXB and SPXW, the width in the first direction X and the width in the second direction Y are, for example, the same as each other. Note that these widths may be different from each other. For example, the width of the subpixel SPXR in the second direction Y may be greater than the width of the subpixel SPXW in the second direction Y. Further, the width of the subpixel SPXG in the first direction X may be greater than the width of the subpixel SPXW in the first direction X. As for the areas of the subpixels, these four subpixels may have the same area as each other or may have different areas from each other. For example, the area of the subpixel SPXG may be greater than the area of the subpixel SPXW or the area of the subpixel SPXB.

As described above, in the example shown in FIG. 5, the subpixel SPXG and the subpixel SPXW are arranged diagonally in the pixel PX. In the pixel PX shown in FIG. 5, the position of the subpixel SPXG and the position of the subpixel SPXW may be switched to each other. Further, the position of the subpixel SPXR and the position of the subpixel SPXB may be switched to each other. Still further, the position of one of the subpixels SPXG and SPXW may be switched to the position of the subpixel SPXR, and the position of the other one of the subpixels SPXG and SPXW may be switched to the position of the subpixel SPXB. In these cases also, the subpixel SPXG and the subpixel SPXW can be diagonally arranged.

Note that the subpixels SPXR, SPXG, SPXB and SPXW are arranged in the same manner in all the pixels PX in the example shown in FIG. 5 but may also be arranged in different manners between the adjacent pixels PX. For example, between the pixels PX adjacent to each other in the first direction X, the position of the subpixel SPXG and the position of the subpixel SPXW in one pixel PX may be opposite to the position of the subpixel SPXG and the position of the subpixel SPXW in the other pixel PX. Similarly, between the pixels PX adjacent to each other in the second direction Y, the position of the subpixel SPXG and the position of the subpixel SPXW in one pixel PX may be opposite to the position of the subpixel SPXG and the position of the subpixel SPXW in the other pixel PX.

Next, the planar shape of the detection electrode RX will be described. FIG. 6 is a schematic diagram showing a part of the detection electrode RX. In the present embodiment, the detection electrode RX has a mesh-like electrode pattern. More specifically, the detection electrode RX includes first conductive lines CL1 which are parallel to each other, and second conductive lines CL2 which are parallel to each other. The first conductive lines CL1 and the second conductive lines CL2 cross each other, respectively. For example, each of the conductive lines CL1 and CL2 has a single layer structure or a multilayer structure which includes a layer formed of a metal material of at least one of aluminum (Al), copper (Cu), silver (Ag), and an alloy thereof. It is possible, by using a metal material for the conductive lines CL1 and CL2, to reduce the resistance of the conductive lines CL1 and CL2 as compared to those formed only of a transparent conductive material such as ITO. Note that, as the metal material for the conductive lines CL1 and CL2, an appropriate metal material may be used according to an objective to be achieved such as suppression of reflected light associated with metal or improvement of efficiency of manufacturing processes of the conductive lines CL1 and CL2.

The first conductive lines CL1 extend in a first extension direction D1 which is inclined at an angle θ1 clockwise with respect to the second direction Y. The second conductive lines CL2 extend in a second extension direction D2 which is inclined at an angle θ2 counterclockwise with respect to the second direction Y. In the example shown in FIG. 6, the angle θ1 and the angle θ2 are the same as each other. Note that the angle 91 and the angle θ2 may be different from each other.

The first conductive lines CL1 are arranged in the first direction X with a pitch Pc1. The second conductive lines CL2 are arranged in the first direction X with a pitch Pc2. In the example shown in FIG. 6, the pitch Pc1 and the pitch Pc2 are the same as each other. Note that the pitch Pc1 and the pitch Pc2 may be different from each other The dummy electrode DX shown in FIG. 1 has a pattern, for example, similar to that of the detection electrode RX shown in FIG. 6. In the pattern of the dummy electrode DX, for example, first conductive lines CL1 and second conductive lines CL2 may be disconnected from each other at the intersections or on the lines connecting the intersections of the first conductive lines CL1 and the second conductive lines CL2.

In planar view, the first conductive lines CL1 and the second conductive lines CL2 included in the detection electrodes RX and the dummy electrodes DX overlap the display area DA. Therefore, the pixel pattern formed of the subpixels SPXR, SPXG, SPXB and SPXW in the display area DA interferes with the electrode pattern formed of the first conductive lines CL1 and the second conductive lines CL2, and this will cause moiré.

However, according to the pixel layout of the present embodiment, such moiré can be prevented. In the following, this technical effect of the present embodiment will be described with reference to a comparative example.

FIG. 7 is a diagram showing a pixel layout of a comparative example of the present embodiment. In this example, a pixel PX includes a subpixel SPXR configured to perform red display, a subpixel SPXG configured to perform green display, and a subpixel SPXB configured to perform blue display. The subpixels SPXR, SPXG and SPB are arranged in the first direction X in this order and are elongated in the second direction Y. The pixels PX are arranged in the first direction X with a pitch Px and are arranged in the second direction Y with a pitch Py.

In general, the luminance of the display colors of the subpixels SPXG and SPXW is higher than the luminance of the display colors of the subpixels SPXR and SPXB. Therefore, the interference of the subpixels SPXG and SPXW with the detection electrodes RX and the dummy electrodes DX will be a major cause of moiré.

Figure 8:
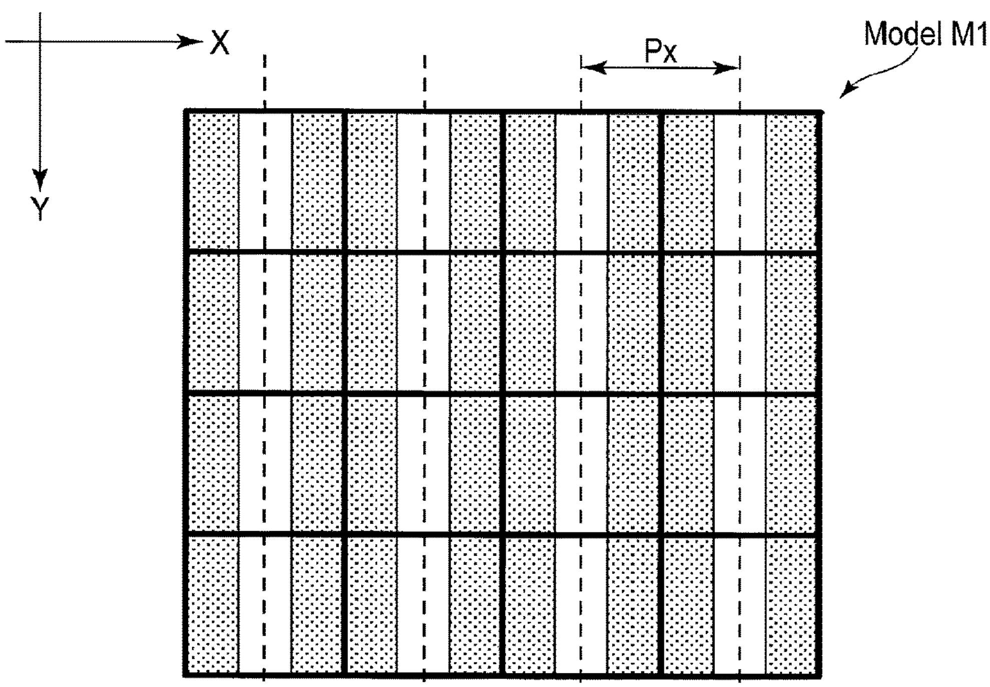
FIG. 8 is a diagram showing a model in which each subpixel is replaced with a white area or a black area in the pixel layout of FIG. 7.

FIG. 8 shows a model M1 where the subpixel SPXG is replaced with a white area and the subpixels SPXR and SPXB are replaced with black areas in the pixel layout shown in FIG. 7. Further, FIG. 9 shows a model M2 where the subpixels SPXG and SPXW are replaced with white areas and the subpixels SPXR and SPXB are replaced with black areas in the pixel layout shown in FIG. 5.

In the model M1 shown in FIG. 8, a striped pattern of white areas and black areas elongated in the second direction Y and arranged alternately in the first direction X is formed. In the model M1, the pitch of the white area in the first direction X is the same as the pitch Px of the pixel PX. That is, the model M1 exhibits pitch Px periodicity in the first direction X but does not exhibit any periodicity in the second direction Y.

On the other hand, in the model M2 shown in FIG. 9, a checkered pattern of white areas and black areas arranged alternately in the first direction X and in the second direction Y is formed. If the subpixels SPXR, SPXG, SPXB and SPXW have the same width in the first direction X, in the model M2, the pitch of the white area in the first direction X will be a half (Px/2) the pitch Px of the pixel PX. Further, if the subpixels SPXR, SPXG, SPXB and SPXW have the same width in the second direction Y, in the model M2, the pitch of the white area in the second direction Y will be a half (Py/2) the pitch Py of the pixel PX.

FIG. 10 shows a graph (a) of a result of analysis of spatial frequencies in the model M1 and a graph (b) of a result of analysis of spatial frequencies in the model M2. A spatial frequency fx in each graph is obtained by means of the Fourier transformation of each of the models M1 and M2. In each graph, the horizontal axis indicates a spatial frequency fx in the first direction X, and the vertical axis indicates an amplitude.

In the model M1 which has a one-dimensional periodic pattern in the first direction X, there is a frequency distribution in the first direction X as shown in FIG. 10 (*a*), but there is hardly any frequency distributions in other directions. On the other hand, in the model M2 which has a two-dimensional periodic pattern in the first direction X and in the second direction Y, in addition to a frequency distribution in the first direction X shown in FIG. 10 (*b*), there are also a frequency distribution in the second direction Y as well as frequency distributions in directions crossing the first direction X and the second direction Y.

Here, the periodic pattern tends to be more visible as the spatial frequency decreases and the amplitude increases. In FIGS. 10 (*a*) and (*b*), the low frequency areas are partly circled with broken lines. Between the low frequency areas of the models M1 and M2, the amplitudes of the frequency components of the model M2 are less than the amplitudes of the frequency components of the model M1. Note that, between the high frequency areas of the models M1, and M2 also, the amplitudes of the frequency components of the model M2 are generally less than the amplitudes of the frequency components of the model M1. These differences result from the following differences between the model M1 and the model M2. For one thing, the frequency components are concentrated on one direction in the model M1, whereas the frequency components are spread to various directions in the model M2. For another, between the pitches of the white areas shown in FIGS. 8 and 9, the pitch of the white area of the model M1 is less than the pitch of the white area of the model M2 (in other words, another reason for the differences is that the white area has a high frequency).

FIG. 11 shows a graph (a) of a result of analysis of spatial frequencies of an image in which the model M1 and the electrode pattern shown in FIG. 6 overlap each other and a graph (b) of a result of spatial frequencies of an image in which the model M2 and the electrode pattern shown in FIG. 6 overlap each other. Here, the electrode pattern which overlaps the model M1 and the electrode pattern which overlaps the model M2 have the same pitches Pc1 and Pc2 and form the same angles θ1 and θ2.

The frequency components shown in each of the graphs (a) and (b) of FIG. 11 correspond to the moiré created when each of the models M1 and M2 overlaps the detection electrodes RX. Further, the amplitude of each frequency component corresponds to the intensity of moiré. In these graphs also, between the low frequency areas circled with broken lines in these models, the amplitudes of the frequency components shown in FIG. 11 (*b*) are less than the amplitudes of the frequency components shown in FIG. 11 (*a*). This is because, as shown in FIG. 10, the amplitudes of the frequency components of the model M2 are less than the amplitude of the frequency components of the model M1.

As is evident from the above, according to the pixel layout of the present embodiment, as compared to the pixel layout of the comparative example shown in FIG. 7, moiré associated with the interference of the pixel layout with the detection electrodes RX can be suppressed. The same also applies to moiré associated with the interference of the pixel layout with the dummy electrodes DX. Note that the present embodiment is not restrictedly effective against the comparative example shown in FIG. 7 but is also effective, for example, against such a layout of pixels, each pixel including subpixels SPXR, SPXG, SPXB and SPXW arranged in one direction.

Further, it is possible to further enhance the technical effect of preventing moiré by optimizing the pitches Pc1 and Pc2 and the angles θ1 and θ2. FIG. 12 is a table showing results of evaluation of moiré created when the pixel pattern shown in FIG. 5 overlaps the electrode pattern shown in FIG. 6. In the evaluation, the ratio of the pitch Pc1 to the pitch Px (Pc1/Px) was gradually increased from 1.8 to 6.0 by 0.2, while the angle θ1 was gradually increased from 5° to 36°, and then the degree of moiré was rated at levels 1 to 3. Further, level 1 represents the most excellent result indicating that moiré was not noticeable, level 2 represents the next excellent result to level 1, and level 3 represents the poorer result than level 2. Note that the pitches Px and Py, the pitches Pc1 and Pc2, and the angles θ1 and θ2 are the same as each other, respectively (Px=Py, Pc1=Pc2, and θ1=θ2).

According to the evaluation results, when the pitch Pc1 is about 2.2 times the pitch Px or more and about 3.2 times the pitch Px or less, moiré can be suppressed excellently. Further, when the pitch Pct is about 2.6 times the pitch Px or more and about 2.8 times the pitch Px or less, moiré can be suppressed even more.

Still further, from another point of view, when the angle θ1 is between 10° and 31° inclusive, moiré can be suppressed excellently. Still further, when the angle θ1 is between 13° and 27° inclusive, moiré can be suppressed even more.

As described above, according to the present embodiment, it is possible to suppress moiré by diagonally arranging the subpixels SPXG and SPXW which have relatively high luminance. Further, according to the pixel layout of the present embodiment, it is possible to suppress moiré even more by setting the pitches Pc1 and Pct and the angles θ1 and θ2 to the above-described ranges.

As an alternative moiré prevention method, for example, a method of extending the conductive lines included in the detection electrode RX and in the dummy electrode DX in random directions or forming the pitches in random dimensions may be considered. In these methods, since there is no regularity of the interference between the conductive lines and the pixels, moiré can be prevented. However, this random electrode pattern will include numerous spatial frequency components. In a display device 1 comprising such detection electrodes RX and dummy electrodes DX, when external light is reflected off the detection electrodes RX and the dummy electrodes DX, the reflected light is visually recognized as glare associated with the detection electrodes RX and the dummy electrodes DX, and consequently the display quality will be degraded. On the other hand, in the present embodiment, since the electrode pattern is not a random pattern, there will be hardly any glare associated with the detection electrodes RX and the dummy electrodes DX. Note that it is also possible to apply the present embodiment to a part of the display area DA and to form a random electrode pattern in the other part of the display area DA according to the intensity of glare and the intensity of moiré. Further, it is also possible to set the pitches and the angles of the conductive lines CL1 and CL2 appropriately (randomly or unequally) in the display area DA within the ranges of the present embodiment.

In addition to the above-described technical effects, the present embodiment can produce various other positive technical effects.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiment described herein may be made without departing from the spirit of the invention. The accompanying claims and their equivalents are intended to cover such forms or modifications as would fall within the scope and spirit of the inventions.

For example, in the present embodiment, the detection electrode RX is assumed to have a mesh-like electrode pattern formed of the first conductive lines CL1 and the second conductive lines CL2. However, the detection electrode RX can have various other forms. For example, the detection electrode RX may have an electrode pattern formed of conductive lines meandering in a predetermined direction, an electrode pattern including a polygon other than a quadrangle enclosed with conductive lines, an electrode pattern formed of conductive lines curved in a predetermined direction, or the like. Even in the detection electrode RX having such an electrode pattern, it is also possible to prevent moiré by applying the pixel layout of the present embodiment.

Further, the evaluation shown in FIG. 12 corresponds to the evaluation in a case where the pitch Pc1 and the pitch Pc2 are the same as each other and the angle θ1 and the angle θ2 are the same as each other. However, even if the pitch Pc1 and the pitch Pc2 are different from each other or the angle θ1 and the angle θ2 are different from each other, it is also possible to prevent moiré by adjusting the pitches Pc1 and Pc2 and the angles θ1 and 92. For example, when the pitch Pc1 and the pitch Pc2 are different from each other, if both of these pitches are set to be about 2.2 times the pitch Px or more and about 3.2 times the pitch Px or less, more preferably, about 2.6 times the pitch Px or more and about 2.8 times the pitch Px or less, the moiré prevention effect can be expected. Further, when the angle θ1 and the angle θ2 are different from each other, if both of these angles are set to be between 10° and 31° inclusive, more preferably, between 13° and 27° inclusive, the moiré prevention effect can be expected.

Still further, in the present embodiment, the pixel PX is assumed to comprise the subpixel configured to perform red display, the subpixel configured to perform green display, the subpixel configured to perform blue display, and the subpixel configured to perform white display. However, the display colors of the subpixels are not limited to these display colors. Even if the display colors of the subpixels are different from those of the present embodiment, for example, it is also possible to produce a moiré prevention effect similar to that produced by the present embodiment by diagonally arranging a subpixel whose display color has the highest luminance and a subpixel whose display color has the second highest luminance. For example, when a red subpixel, a blue subpixel, and two green subpixels are to be disposed in the area corresponding to the above-described pixel, it is possible to apply the present embodiment by diagonally arranging these two green subpixels.

Further, in the present embodiment, the driving electrode TX is used for object detection as well as for image display. However, an electrode for object detection and an electrode for image display may be separately provided instead. In that case, for example, the driving electrode Tx may be formed on one main surface of a transparent substrate such as a glass substrate, and the detection electrode RX may be formed on the other main surface of the substrate.

Still further, in the present embodiment, as an object detection method, a mutual-capacitive method of detecting an object by the detection electrode RX and the driving electrode TX is described. However, as an object detection method, for example, various other methods such as a method of detecting an object by using the capacitance of the detection electrode RX itself (referred to as a self-capacitance detection method or the like) and the like may be used.

What is claimed is:

1. A display device comprising:

a display area which includes a plurality of pixels; and a detection electrode which includes a plurality of first conductive lines overlapping the display area, wherein each of the pixels includes a first subpixel, a second subpixel adjacent to the first subpixel in a first direction, a third subpixel adjacent to the first subpixel in a second direction crossing the first direction, and a fourth subpixel adjacent to the third subpixel in the first direction and adjacent to the second subpixel in the second direction, the pixels are arranged in the first direction with a first pitch, the first conductive lines are arranged in the first direction with a second pitch which falls within a range of 2.2 times the first pitch or more and 3.2 times the first pitch or less, and luminance of a display color of each of the second subpixel and the third subpixel is higher than luminance of a display color of each of the first subpixel and the fourth subpixel.

2. The display device of claim 1, further comprising a detection module which detects an object in proximity to the display area based on a signal from the detection electrode.

3. The display device of claim 1, wherein the second pitch falls within a range of 2.6 times the first pitch or more and 2.8 times the first pitch or less.

4. The display device of claim 1, wherein each of the first conductive lines forms an angle of between 10° and 31° inclusive with respect to the second direction.

5. The display device of claim 4, wherein each of the first conductive lines forms an angle of between 13° and 27° inclusive with respect to the second direction.

6. The display device of claim 1, wherein a display color of each of the second subpixel and the third subpixel is green or white.

7. The display device of claim 1, wherein a display color of each of the first subpixel and the fourth subpixel is red or blue, and a display color of each of the second subpixel and the third subpixel is green.

8. The display device of claim 1, wherein the detection electrode includes a plurality of second conductive lines which overlap the display area, extend parallel to each other, and cross the first conductive lines, and the second conductive lines are arranged in the first direction with a third pitch which falls within a range of 2.2 times the first pitch or more and 3.2 times the first pitch or less.

9. The display device of claim 8, wherein each of the second conductive lines forms an angle of between 10° and 31° inclusive with respect to the second direction.

10. The display device of claim 1, further comprising:

a pixel electrode provided in each of the first subpixel, the second subpixel, the third subpixel, and the fourth subpixel; and a driving electrode which produces an electrical field for image display between the driving electrode and the pixel electrode, wherein the detection electrode produces capacitance between the detection electrode and the driving electrode and outputs a signal according to a change in the capacitance.

11. The display device of claim 1, wherein the pixels are arranged in the first direction and in the second direction with the first pitch.

12. The display device of claim 1, wherein the first subpixel, the second subpixel, the third subpixel, and the fourth subpixel have the same area as each other.

13. A display device comprising:

a display area which including a plurality of pixels arranged in a matrix, wherein each of the pixels includes a first subpixel, a second subpixel adjacent to the first subpixel in a first direction, a third subpixel adjacent to the first subpixel in a second direction crossing the first direction, and a fourth subpixel adjacent to the third subpixel in the first direction and adjacent to the second subpixel in the second direction, and luminance of a display color of each of the second subpixel and the third subpixel is higher than luminance of a display color of each of the first subpixel and the fourth subpixel.

14. The display device of claim 13, wherein a display color of each of the first subpixel and the fourth subpixel is red or blue, and a display color of each of the second subpixel and the third subpixel is green or white.

15. The display device of claim 13, wherein a display color of each of the first subpixel and the fourth subpixel is red or blue, and a display color of each of the second subpixel and the third subpixel is green.

16. The display device of claim 13, wherein the pixels are arranged in the first direction and in the second direction with a first pitch.

17. The display device of claim 13, wherein the first subpixel, the second subpixel, the third subpixel, and the fourth subpixel have the same area as each other.

* * * * *